(12) United States Patent
Inoue (10) Patent No.: US 12,472,937 B2
(45) Date of Patent: Nov. 18, 2025

(54) PARKING ASSIST DEVICE, PARKING ASSIST METHOD, AND VEHICLE

(71) Applicant: TOYOTA JIDOSHA KABUSHIKI KAISHA, Aichi-ken (JP)

(72) Inventor: Kota Inoue, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 196 days.

(21) Appl. No.: 18/459,428

(22) Filed: Sep. 1, 2023

(65) Prior Publication Data

US 2024/0132057 A1 Apr. 25, 2024
US 2024/0227786 A9 Jul. 11, 2024

(30) Foreign Application Priority Data

Oct. 25, 2022 (JP) ................. 2022-170384

(51) Int. Cl.
*B60W 30/06* (2006.01)
*E05B 85/10* (2014.01)
*E05B 85/16* (2014.01)
*G05D 1/00* (2006.01)
*G05D 1/223* (2024.01)

(52) U.S. Cl.
CPC ........... *B60W 30/06* (2013.01); *E05B 85/107* (2013.01); *E05B 85/16* (2013.01); *G05D 1/0016* (2013.01); *G05D 1/223* (2024.01); *B60W 2756/10* (2020.02)

(58) Field of Classification Search
CPC .. B60W 30/06; B60W 2756/10; G05D 1/223; G05D 1/0016; E05B 85/107; E05B 85/16
See application file for complete search history.

(56) References Cited

U.S. PATENT DOCUMENTS

| 8,903,567 | B2 | 12/2014 | Morimoto et al. |
| 10,464,554 | B2 | 11/2019 | Okamura et al. |
| 2014/0132012 | A1 | 5/2014 | Yoshino et al. |
| 2019/0302754 | A1 | 10/2019 | Tsuruoka |
| 2020/0211400 | A1 | 7/2020 | Cho |

(Continued)

FOREIGN PATENT DOCUMENTS

| DE | 102014015655 A1 | 4/2016 |
| JP | 2014-095251 A | 5/2014 |
| JP | 2016-050421 A | 4/2016 |

(Continued)

*Primary Examiner* — Peter D Nolan
*Assistant Examiner* — Matthew Cobb
(74) *Attorney, Agent, or Firm* — HAUPTMAN HAM, LLP (57) ABSTRACT

A parking assist device including a retractable door handle device that includes a door handle with a built-in antenna used for a communication with a terminal carried by a user positioned outside a host vehicle and an actuator that causes the door handle to transition from a first state to a second state, the parking assist device comprising a processor that is configured to communicate with the terminal using the antenna, and that is configured to execute entry control for allowing the host vehicle to enter a parking spot or exit control for allowing the host vehicle to exit from the parking spot when a predetermined condition related to a communication result is met, wherein the processor causes the door handle to transition to the second state when executing the entry control or the exit control.

6 Claims, 7 Drawing Sheets

(56) References Cited

U.S. PATENT DOCUMENTS

2020/0218249 A1 7/2020 Sannodo et al.
2021/0197772 A1 7/2021 Tsumano

FOREIGN PATENT DOCUMENTS

| JP | 2020075669 A | * | 5/2020 | | |
|---|---|---|---|---|---|
| KR | 10-2020-0087329 A | | 7/2020 | | |
| KR | 102459231 B1 | * | 10/2022 | ............. | E05B 81/76 |

* cited by examiner

PARKING ASSIST DEVICE, PARKING ASSIST METHOD, AND VEHICLE

CROSS-REFERENCE TO RELATED APPLICATION

This application claims priority to Japanese Patent Application No. 2022-170384 filed on Oct. 25, 2022, incorporated herein by reference in its entirety.

BACKGROUND

1. Technical Field

The present disclosure relates to a parking assist device that executes entry control for allowing a host vehicle to enter a predetermined parking spot and/or exit control for allowing the host vehicle to exit from the parking spot. The present disclosure also relates to a parking assist method to execute the entry control and/or the exit control. The present disclosure also relates to a vehicle on which the above parking assist device is mounted.

2. Description of Related Art

There has been proposed a parking assist device that detects a parking spot at which a host vehicle can be parked using a sensor mounted on the host vehicle, and that executes entry control for allowing the host vehicle to enter the parking spot (see German Patent No. DE 102014015655, for example).

A processor (a computation device mounted on the host vehicle) of the parking assist device (hereinafter referred to as a "conventional device") described in German Patent No. DE 102014015655 determines a target position based on information acquired from the sensor. The target position is the position of the host vehicle (e.g. the position of the center of gravity of the host vehicle) in the state of being parked. The processor sets a route that leads from the present location (a location outside the parking spot) to the target position. Next, the driver (user) gets out of the host vehicle, starts predetermined application software of a smartphone outside the host vehicle, and executes a predetermined operation. The smartphone emits a signal for advancing the host vehicle in accordance with the operation by the user. The processor moves the host vehicle along the route based on the signal emitted from the smartphone. When the host vehicle reaches the target position, the processor parks the host vehicle. That is, the processor turns off an ignition switch after switching the shift position of the host vehicle to the parking position and actuating the parking brake. In this manner, the user can park the host vehicle at the parking spot by remotely operating the host vehicle from the outside of the vehicle.

Preferably, the user remotely operates the host vehicle at a position at which the user can visually confirm safety around the host vehicle. Thus, a threshold value Δdth (statutory regulation value) is prescribed as the upper limit of a distance Δd between the user and the host vehicle at the time when the user remotely operates the host vehicle. The processor of the conventional device acquires the distance Δd between the user and the host vehicle as follows. Specifically, the processor emits a predetermined first signal S1 (a radio wave in a low-frequency (LF) band) from a transmission antenna TA built in a door handle of the host vehicle. A smart key carried by the user receives the first signal. The intensity of the first signal received by the smart key is correlated with the distance Δd between the user and the host vehicle. That is, the intensity of the first signal received by the smart key is reduced as the distance Δd is increased. The smart key emits a second signal (a radio wave in an ultra-high-frequency (UHF) band) that indicates the intensity of the first signal. The processor acquires the second signal via a reception antenna (e.g. an antenna disposed in a vehicle cabin), and acquires the distance Δd based on the second signal. The processor is configured to be able to advance the host vehicle along the route only when the distance Δd is equal to or less than the threshold value Δdth (statutory regulation value).

SUMMARY

Figure 2A:
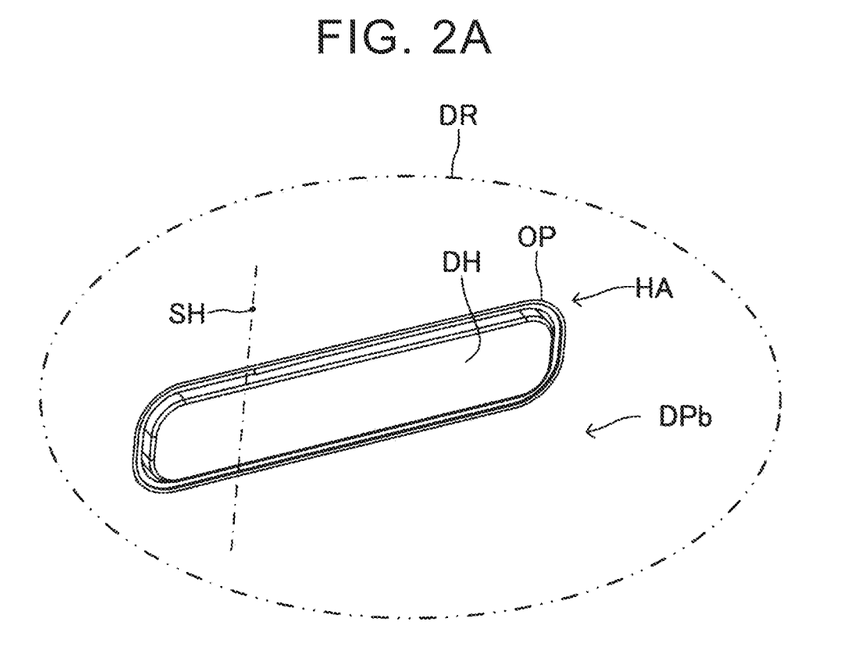
FIG. 2A is a perspective view of a retractable door handle device.
Figure 2B:
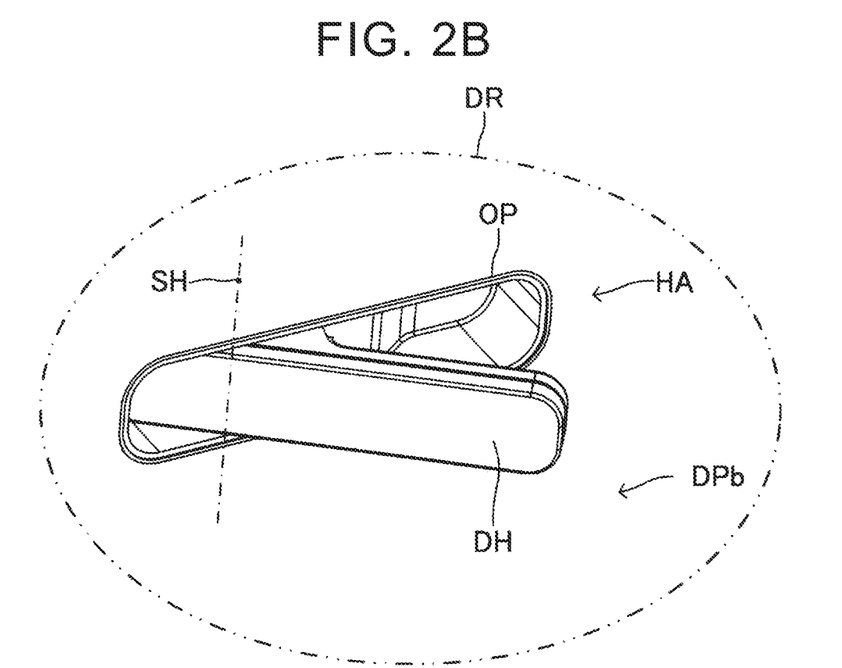
FIG. 2B is a perspective view of the retractable door handle device.
Figure 3A:
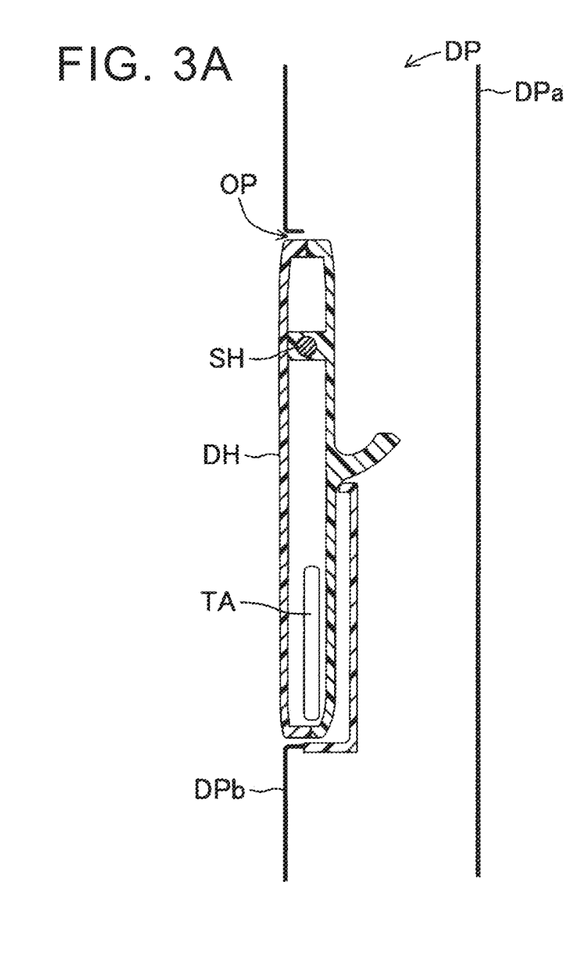
FIG. 3A is a sectional view of the retractable door handle device, taken along a plane that is perpendicular to the vehicle height direction.
Figure 3B:
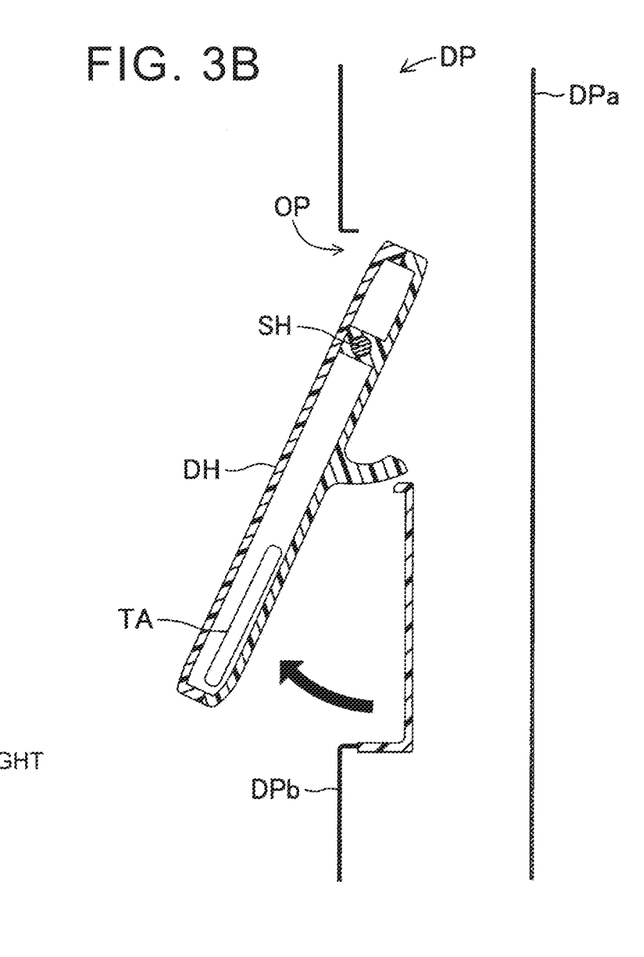
FIG. 3B is a sectional view of the retractable door handle device, taken along a plane that is perpendicular to the vehicle height direction.
Figure 7:
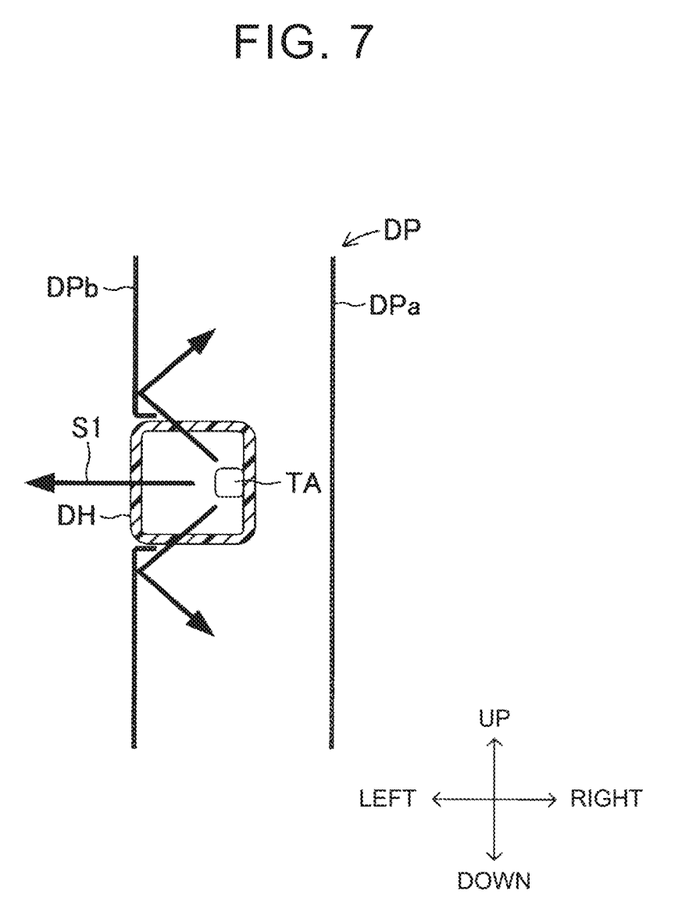
FIG. 7 is a sectional view of a retractable door handle device, taken along a plane that is perpendicular to the vehicle front-rear direction.

There has been proposed a door handle device (retractable door handle device) that enables a door handle of a host vehicle to be retracted in a door panel in a situation in which it is not necessary to open a door of the host vehicle from the outside of the vehicle (see FIGS. 2A, 2B, and 7). That is, an opening portion is provided in a door panel (outer panel), and a door handle can be drawn (pushed) into the door panel (a space between the outer panel and an inner panel) through the opening portion. In a state in which the door handle is retracted in the door panel (hereinafter referred to as a "first state"), the transmission antenna is positioned in the door panel. Therefore, even if the first signal (a radio wave in the LF band) is emitted, only a part of the radio wave that has passed through the door handle which is made of a synthetic resin is radiated to the outside from the opening portion, and the other most part of the radio wave is reflected and attenuated by the inside surface of the door panel which is made of metal (see FIG. 7). That is, the intensity of the first signal radiated to the outside of the vehicle is relatively low. Therefore, the reachable distance of the first signal may be relatively short. For example, the reachable distance of the first signal may be less than the threshold value. Hence, in the first state, the user cannot remotely operate the host vehicle unless the user stays considerably close to the host vehicle.

The present disclosure provides a parking assist device that is applicable to a vehicle that includes a door handle with a built-in antenna that is retractable into a door panel and that communicates with a terminal outside the vehicle via the antenna, the communicable distance of the parking assist device being set to a necessary and sufficient length.

A first aspect of the present disclosure provides a parking assist device to be mounted on a host vehicle including a retractable door handle device that includes:

a door handle with a built-in antenna used for a communication with a terminal carried by a user positioned outside the host vehicle; and an actuator that causes the door handle to transition from a first state in which the door handle is retracted in a door panel to a second state in which a portion of the door handle where the antenna is provided projects outside the door panel, the parking assist device comprising a processor that is configured to communicate with the terminal using the antenna, and that is configured to execute entry control for allowing the host vehicle to enter a parking spot or exit control for allowing the host vehicle to exit from the parking spot when a predetermined condition related to a communication result is met, wherein the processor causes the door handle to transition to the second state when executing the entry control or the exit control.

The processor of the parking assist device according to the present disclosure communicates with the terminal carried by the user positioned outside the vehicle via the antenna built in the door handle when executing the entry control and/or the exit control. In that event, the processor causes the door handle to transition to the second state. This allows the antenna to be disposed on the outer side with respect to the outside surface of the door panel. Hence, when the antenna in the door handle is for transmission, a signal emitted from the antenna is radiated outward of the host vehicle without being interrupted by the door panel. When the antenna in the door handle is for reception, meanwhile, a signal emitted from the terminal is received by the antenna without being interrupted by the door panel. Thus, with the present disclosure, it is possible to set the communicable distance between the processor and the terminal to a necessary and sufficient length.

In the above parking assist device,
after a first signal is emitted from the antenna to the terminal, the processor may acquire a second signal that indicates an intensity of the first signal received by the terminal from the terminal, and determine that the predetermined condition related to the communication result is met when the intensity of the first signal indicated by the second signal is equal to or more than a threshold value.

With this configuration, the processor can detect the distance between the user and the host vehicle relatively easily and precisely based on the second signal.

In the above parking assist device, the processor may be configured to cause the door handle to transition to the first state when the entry control is finished.

With this configuration, strangers cannot grasp the door handle, contributing to crime prevention.

In the above parking assist device,
the processor may be configured to maintain the door handle in the second state when the exit control is finished.

With this configuration, the user can open the door by grasping the door handle and get into the host vehicle when the exit control is completed.

A second aspect of the present disclosure provides a parking assist method to be applied to a host vehicle including a retractable door handle device including:
a door handle with a built-in antenna configured to communicate with a terminal carried by a user positioned outside the host vehicle; and
an actuator that causes the door handle to transition from a first state in which the door handle is retracted in a door panel to a second state in which a portion being part of the door handle and providing the antenna projects outside the door panel,
the parking assist method comprising a first process that executes entry control for allowing the host vehicle to enter a parking spot or exit control for allowing the host vehicle to exit from the parking spot communicating with the terminal using the antenna, when a predetermined condition related to a result that the processor communicates with the terminal is met,
wherein the first process includes the second state that causes the door handle to transition to the second state.

With this configuration, a signal for communication between the processor and the terminal is not interrupted by the door panel, and hence the communicable distance between the processor and the terminal can be set to a necessary and sufficient length.

A third aspect of the present disclosure provides a vehicle comprising:
a retractable door handle device including a door handle with a built-in antenna used for a communication with a terminal that carried by a user positioned outside a host vehicle, and an actuator that causes the door handle to transition from a first state in which the door handle is retracted in a door panel to a second state in which a portion being part of the door handle and providing the antenna projects outside the door panel; and
a parking assist device including a processor configured to communicate with the terminal using the antenna and execute entry control for allowing the host vehicle to enter a parking spot or exit control for allowing the host vehicle to exit from the parking spot when a predetermined condition related to a result of the processor is met,
wherein the processor causes the door handle to transition to the second state when executing the entry control or the exit control.

With this configuration, a signal for communication between the processor and the terminal is not interrupted by the door panel, and hence the communicable distance between the processor and the terminal can be set to a necessary and sufficient length.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline

Figure 1:
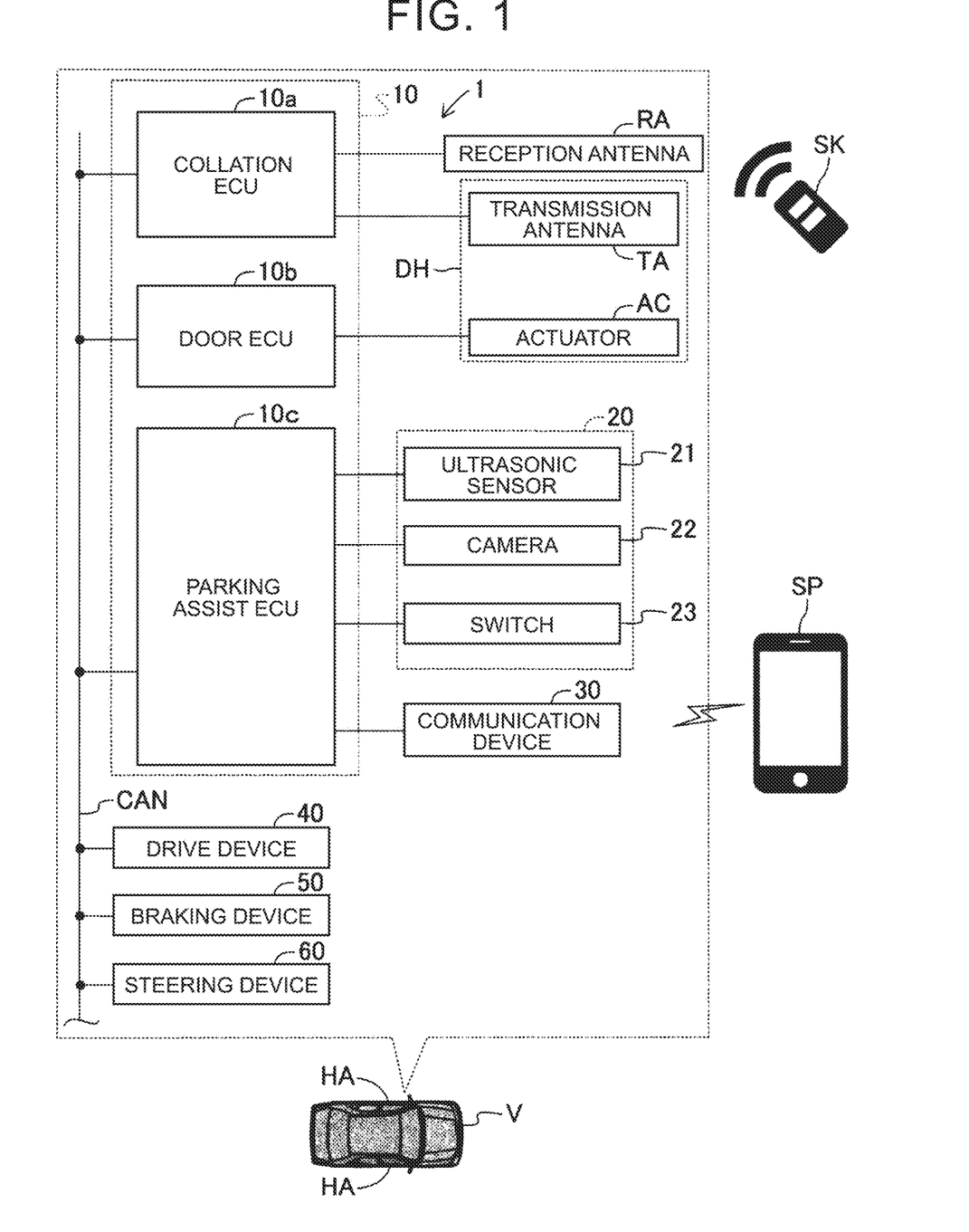
FIG. 1 is a block diagram of a parking assist device according to an embodiment of the present disclosure.

As illustrated in FIG. 1, a parking assist device 1 according to an embodiment of the present disclosure is mounted on a vehicle V (hereinafter referred to as a "host vehicle") that includes a retractable door handle device HA. The parking assist device 1 has an automatic entry function to allow the host vehicle to enter a predetermined parking spot PS and an automatic exit function (autonomous driving function) to allow the host vehicle to exit from the parking spot PS by automatically moving the host vehicle in accordance with a signal received from a smartphone SP operated by a user positioned outside the vehicle.

The configuration of the retractable door handle device HA is described. As illustrated in FIGS. 2A, 2B, 3A, and 3B, the retractable door handle device HA is assembled to a door panel DP of a door DR of the host vehicle. The door panel DP is formed by joining an inner panel DPa and an outer panel DPb. A space is provided between the inner panel DPa and the outer panel DPb. That is, the door panel DP has a box shape (or a bag shape). The retractable door handle device HA is housed in the door panel DP. The retractable door handle device HA includes a door handle DH. The door handle DH is made of a synthetic resin. The door handle DH is a hollow component that extends in the front-rear direction. A transmission antenna TA is housed (built) in the door handle DH.

The outer panel DPb is provided with an opening portion OP generally in the same shape as the outer shape of the door handle DH. The door handle DH is assembled to the peripheral edge portion of the opening portion OP (the inside surface of the outer panel DPb) via a bracket (not illustrated). The front end portion of the door handle DH is supported to be turnable about a shaft SH that extends in the up-down direction. The door handle DH can be turned clockwise in FIG. 3A to transition from a first state (retracted state) illustrated in FIGS. 2A and 3A to a second state (developed state) illustrated in FIGS. 2B and 3B. Meanwhile, the door handle DH can be turned counterclockwise in FIG. 3B to transition from the second state to the first state illustrated in FIGS. 2A and 3A. In the first state, the outer peripheral edge portion of the door handle DH extends along the inner peripheral edge portion of the opening portion OP, and the outside surface of the door handle DH and the outside surface of the outer panel DPb are positioned generally in the same plane. In the second state, meanwhile, the rear half portion of the door handle DH (a portion in which the transmission antenna TA is housed) projects outward from the outside surface of the outer panel DPb.

Additionally, the retractable door handle device HA includes an actuator AC (see FIG. 1). The actuator AC includes a link mechanism composed of a cam, a lever, a spring, a gear, etc. (not illustrated) and an electric motor. The electric motor of the actuator AC is rotated (forward or in reverse) in accordance with a drive signal supplied from a door ECU 10b to be discussed later. A rotational drive force of the electric motor acts on the door handle DH via the link mechanism. This allows the door handle DH to transition (be developed) from the first state to the second state, or to transition (be retracted) from the second state to the first state. The door handle DH is retracted normally (in a situation in which the host vehicle is traveling, a situation in which the user is far away from the host vehicle, etc.). The door handle DH is developed when the user executes a predetermined operation in the vicinity of the host vehicle when getting in the host vehicle. This allows the user to open the door DR by grasping the door handle DH.

Specific Configuration

As illustrated in FIG. 1, the parking assist device 1 includes a control unit 10, an in-vehicle sensor 20, a communication device 30, a drive device 40, a braking device 50, and a steering device 60.

The control unit 10 includes a collation ECU 10a, a door ECU 10b, and a parking assist ECU 10c. Each of the ECUs is constituted of a microcomputer device that includes a central processing unit (CPU), a random access memory (RAM), and a read only memory (ROM). In addition, the ECUs are connected to each other via a controller area network (CAN). Further, the ECUs are connected to other ECUs of the host vehicle (e.g. ECUs of the drive device 40, the braking device 50, the steering device 60, etc. to be discussed later) via the CAN.

The collation ECU 10a can communicate with a smart key SK via the transmission antenna TA built in the door handle DH and a reception antenna RA disposed in a vehicle cabin. That is, the collation ECU 10a emits various signals (radio waves in the LF band) from the transmission antenna TA. In addition, the collation ECU 10a receives various signals (radio waves in the UHF band) emitted from an external device (smart key SK). The various signals emitted from the smart key SK include predetermined authentication information. The collation ECU 10a determines whether the authentication information in the received signal coincides with authentication information allocated in advance to the host vehicle. Then, the collation ECU 10a executes a process corresponding to the signal when the authentication information in the received signal coincides with the authentication information allocated in advance to the host vehicle.

For example, the collation ECU 10a emits a predetermined first signal S1 from the transmission antenna TA of the door handle DH. When the first signal S1 is received, the smart key SK emits a second signal S2 that indicates the intensity of the received first signal S1. When the second signal S2 is received, the collation ECU 10a computes a distance $\Delta d$ between the user and the host vehicle based on the second signal S2. Then, the collation ECU 10a transmits the distance $\Delta d$ to another ECU (the parking assist ECU 10c to be discussed later).

The door ECU 10b controls various devices built in the door DR of the host vehicle. Specifically, the door ECU 10b locks or unlocks the door of the host vehicle by controlling an actuator of a door locking device (not illustrated). In addition, the door ECU 10b retracts and develops the door handle DH by controlling the actuator AC of the retractable door handle device HA.

The parking assist ECU 10c acquires various pieces of information (signals) from the in-vehicle sensor 20 to be discussed later and the smartphone SP operated by the user. Then, the parking assist ECU 10c moves the host vehicle by controlling the drive device 40, the braking device 50, and the steering device 60, to be discussed later, based on such information.

The in-vehicle sensor 20 includes an ambient sensor that acquires information about a target that is present around the host vehicle. For example, the in-vehicle sensor 20 includes an ultrasonic sensor 21 and a camera 22 as ambient sensors. The sensors are connected to the parking assist ECU 10c in a wired manner.

The ultrasonic sensor 21 intermittently radiates an ultrasonic wave in a region around the host vehicle, and receives an ultrasonic wave (reflected wave) reflected by a three-dimensional object. The ultrasonic sensor 21 recognizes the distance between the host vehicle and the three-dimensional object, the position (direction) of the three-dimensional object relative to the host vehicle, etc. based on the time since an ultrasonic wave is transmitted until a reflected wave is received, and transmits the result of the recognition to the parking assist ECU 10c.

The camera 22 includes imaging devices and an image analysis device. The imaging devices are digital cameras that incorporate an imaging element such as a charge coupled device (CCD) or a complementary metal oxide semiconductor (CMOS) image sensor (CIS), for example. The imaging devices are installed at the front portion, the rear portion, the right side surface portion, and the left side surface portion of the host vehicle. The imaging devices acquire image data by imaging regions around the host vehicle at a predetermined frame rate. The imaging devices transmit the image data to the image analysis device. The image analysis device analyzes the acquired image data to acquire information about a target that is present around the host vehicle from the images. For example, the image analysis device recognizes the shape and the color of a wall, a fence, etc., the road surface pattern, etc. of the parking spot PS, and transmits the result of the recognition to the parking assist ECU 10c.

Further, the in-vehicle sensor 20 includes a switch 23. The switch 23 is an operation device that allows a driver to request start of automatic parking control to be discussed later. The switch 23 includes a normally open switch device of a push button type, for example. The switch 23 may be an icon displayed on a display device with a built-in touch panel (not illustrated). The parking assist ECU 10c monitors whether the switch 23 is on or off.

The communication device 30 is connected to the parking assist ECU 10c in a wired manner. The communication device 30 conforms to a general-purpose wireless communication protocol. For example, the communication device 30 can wirelessly communicate with the smartphone SP that conforms to the same wireless communication protocol. That is, the communication device 30 transmits data acquired from the parking assist ECU 10c to the smartphone SP. In addition, the communication device 30 supplies data received from the smartphone SP to the parking assist ECU 10c. For example, the smartphone SP functions as a remote operation device that remotely operates the host vehicle by executing predetermined application software. That is, the smartphone SP emits a signal (an advancement permission signal to be discussed later) for remotely operating the host vehicle in accordance with an operation by the user. This signal is transferred to the parking assist ECU 10c via a wireless communication line and the communication device 30.

The drive device 40 applies a drive force to drive wheels among wheels (right front wheel, left front wheel, right rear wheel, and left rear wheel). The drive device includes an engine ECU, an internal combustion engine, a transmission, a drive force transmission mechanism that transfers a drive force to the wheels, etc. The internal combustion engine includes an actuator that drives a throttle valve. The engine ECU acquires information (a control signal) that indicates a target drive force from another ECU (parking assist ECU 10c), and drives the actuator of the internal combustion engine based on such information. The drive force to be applied to the drive wheels is controlled in this manner. The drive force generated by the internal combustion engine is transferred to the drive wheels via the transmission and the drive force transfer mechanism. In addition, the engine ECU acquires information (a control signal) related to a shift position of the transmission from another ECU, and drives the actuator of the internal combustion engine based on such information. The shift position of the transmission is controlled in this manner.

When the vehicle on which the parking assist device 1 is mounted is a hybrid electric vehicle (HEV), the engine ECU can control the drive force of the vehicle generated by one or both of the "internal combustion engine and electric motor" as vehicle drive sources. When the vehicle to which the parking assist device 1 is applied is a battery electric vehicle (BEV), meanwhile, an electric motor ECU that controls the drive force of the vehicle generated by the "electric motor" as a vehicle drive source may be used in place of the engine ECU.

The braking device 50 applies a braking force to the wheels (brake discs). The braking device 50 includes a brake ECU, brake calipers, etc. The brake calipers include an actuator that presses a brake pad against a brake disc. The brake ECU acquires information (a control signal) that indicates a target braking force from another ECU, and drives the actuators of the brake calipers based on such information. The braking force to be applied to the wheels (brake discs) is controlled in this manner.

The steering device 60 controls steering angles of steered wheels (right front wheel and left front wheel). The steering device 60 includes a steering ECU, a steering mechanism, etc. The steering mechanism is a link mechanism that includes a knuckle arm, a tie rod, etc. The steering device 60 further includes an actuator that changes the steering angle by driving the steering mechanism. The steering ECU acquires information (a control signal) that indicates a target steering angle from another ECU, and drives the actuator based on such information. The steering angle of the steered wheels is controlled in this manner.

Automatic Entry Function

The driver temporarily stops the host vehicle in the vicinity of the parking spot PS at which the host vehicle is to be parked. At this stage, the door handle DH has been retracted. Then, the driver pushes the switch 23. This allows the parking assist ECU 10c of the parking assist device 1 to start execution of a program PR for implementing the automatic entry function. That is, the parking assist ECU 10c starts automatic entry control for causing the host vehicle to automatically enter the parking spot PS. Specifically, when it is detected that the switch 23 has been pushed, the parking assist ECU 10c acquires data that indicate the result of recognition of a target that is present around the host vehicle from the ultrasonic sensor 21 and the camera 22. Then, the parking assist ECU 10c specifies the parking spot PS at which the host vehicle is to be parked based on the data acquired from the ultrasonic sensor 21 and the camera 22, and generates a map M1 including the parking spot PS illustrated in FIG. 4. The map M1 is a plan view illustrating the present position and the posture of the host vehicle with respect to the parking spot PS.

Figure 4:
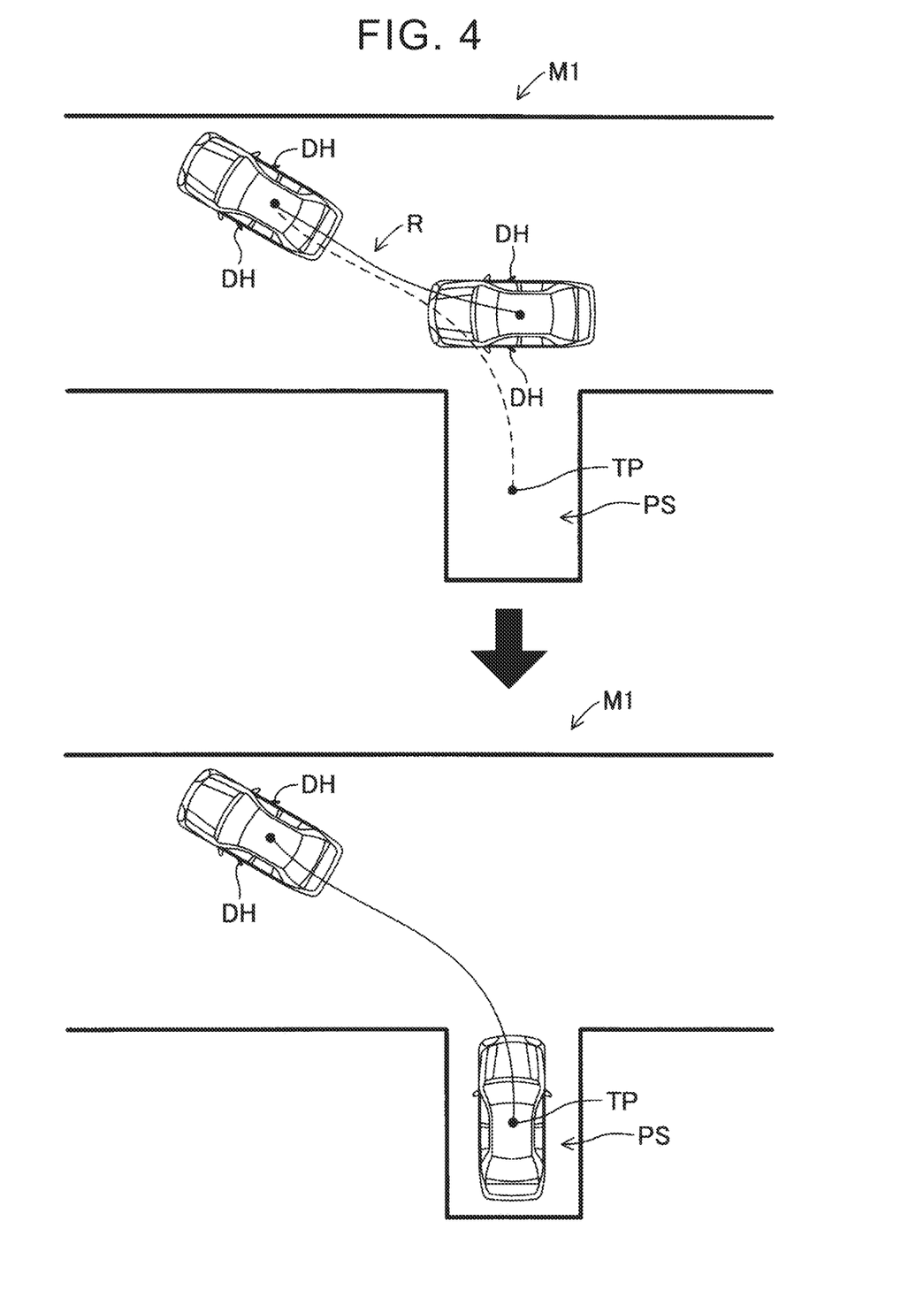
FIG. 4 is a plan view illustrating a scene in which a host vehicle is moved along a set route and parked at a parking spot.

Next, the parking assist ECU 10c sets a target position TP at which the host vehicle is to be parked at the parking spot PS based on the map M1. The target position TP is the position of the center of gravity of the host vehicle at the time when it is assumed that the host vehicle is parked. Next, the parking assist ECU 10c sets (computes) a route R (target locus of the center of gravity of the host vehicle) along which the host vehicle can be moved to the target position TP while avoiding obstructions. Next, the parking assist ECU 10c sets a control signal pattern for moving the host vehicle along the route R (time-series data on control signals to be supplied to the drive device 40, the braking device 50, and the steering device 60).

The parking assist ECU 10c reflects the target position TP and the route R in the map M1. The parking assist ECU 10c displays the map M1 on an in-vehicle display (not illustrated). This allows the user to confirm that there is no problem with the route R, the target position TP, etc. being displayed.

Next, the user starts application software for remote operation installed in advance in the smartphone SP. This allows the smartphone SP to be connected to the parking assist ECU 10c via a wireless communication line and the communication device 30. Then, the smartphone SP functions as a device for remotely operating the host vehicle. Specifically, the smartphone SP displays an image for remote operation. This image includes a dial which is an image as an operation element for advancing the host vehicle along the route R and an end button which is an image for ending the automatic entry control, for example.

Figure 5:
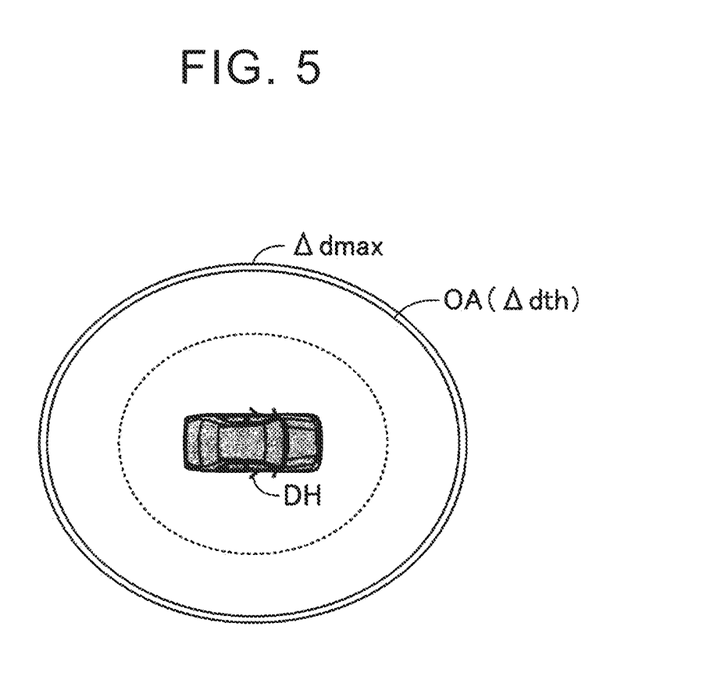
FIG. 5 is a plan view illustrating a reachable range (communicable range) of a first signal.

When the communication device 30 is connected to the smartphone SP via a wireless communication line, the parking assist ECU 10c develops the door handles DH on the driver's seat side and the passenger's seat side (causes the door handles DH to transition from the first state to the second state) by controlling the actuator AC via the door ECU 10b. In a state in which the door handles DH are developed, the transmission antenna TA is positioned on the outer side with respect to the outside surface of the outer panel DPb. Therefore, as illustrated in FIG. 5, the reachable distance (continuous line portion in the drawing) of the first signal S1 (a radio wave in the LF band) emitted from the transmission antenna TA in the second state is longer than the reachable distance (broken line portion in the drawing) of the first signal S1 in a state in which the door handle DH has been retracted. Specifically, a reachable distance Δmax of the first signal S1 in the second state is slightly longer than the threshold value Δdth (6 meters (statutory regulation value) as the upper limit value of the distance between the operator and the vehicle at the time when the vehicle is remotely operated).

The user gets off the host vehicle while carrying the smart key SK and the smartphone SP. Then, when the user rotates the dial displayed on the smartphone SP outside the vehicle, the smartphone SP emits an entry signal (advancement permission signal) that indicates advancement of the host vehicle along the route R. The entry signal is emitted when the user is executing an operation to rotate the dial. The entry signal is not emitted any more when the user stops the operation to rotate the dial.

The parking assist ECU 10c sequentially acquires the distance Δd from the collation ECU 10a. The parking assist ECU 10c determines whether the user is positioned in an operable range OA (a range in which the distance Δd is equal to or less than the threshold value Δdth) based on the distance Δd. When the user is positioned in the operable range OA and the entry signal is received, the host vehicle is controlled in accordance with the control signal pattern described above. This allows the host vehicle to gradually advance along the route R. The parking assist ECU 10c temporarily stops the host vehicle when the distance Δd is more than the threshold value Δdth or when the entry signal is not received. When the distance Δd is more than the threshold value Δdth, the parking assist ECU 10c displays an image indicating that the user is out of the operable range OA.

When a pedestrian, a bicycle, etc. approaches the host vehicle, for example, the user can temporarily stop the host vehicle by holding the dial stationary. The parking assist ECU 10c sequentially acquires the result of recognition of a target that is present around the host vehicle from the ultrasonic sensor 21 and the camera 22 while advancing the host vehicle along the route R. Then, the parking assist ECU 10c temporarily stops the host vehicle upon detecting an obstruction that hinders advancement of the host vehicle based on the above recognition result. In this case, the parking assist ECU 10c displays an image that indicates the presence of an obstruction on the smartphone SP. In this situation, the parking assist ECU 10c cannot receive the first signal S1. Hence, the host vehicle is not advanced even if the user operates the dial. When the obstruction is moved away from the host vehicle and the host vehicle becomes able to be advanced, the parking assist ECU 10c becomes able to receive the first signal S1. When the obstruction is not moved and the duration of a state in which the host vehicle cannot be advanced along the route R has exceeded a threshold value, the parking assist ECU 10c determines whether "it is possible to set a new route R that allows the host vehicle to reach the target position TP while avoiding the obstruction". When it is possible to set a new route R, the parking assist ECU 10c temporarily displays the new route R on the smartphone SP. Then, the parking assist ECU 10c becomes able to receive the first signal S1. The user can advance the host vehicle along the new route R by operating the dial. The dial may be rotated in any direction (clockwise or counterclockwise). That is, the parking assist ECU 10c performs control of the drive device etc. in accordance with the control signal patterns when the user rotates the dial clockwise or counterclockwise.

The parking assist ECU 10c stops the host vehicle when the host vehicle reaches the target position TP. Further, the parking assist ECU 10c switches the shift position to the parking position, and actuates the parking brake. Additionally, the parking assist ECU 10c retracts the door handle DH (causes the door handle DH to transition from the second state to the first state) by controlling the actuator AC via the door ECU 10b. Then, the control unit 10 turns off the ignition switch of the host vehicle.

When a predetermined end condition is met in the middle of the automatic parking control, the parking assist device 1 ends execution of the automatic entry control. Specifically, the end condition is met when the user taps an end button. The end condition is also met when the user gets in the host vehicle and starts operating an operation device for the host vehicle. The end condition is also met when the duration of a state in which the user is out of the operable range OA has exceeded a threshold value. The end condition is also met when the duration of a state in which communication between the parking assist ECU 10c and the smartphone SP is interrupted (a state in which the user does not operate the smartphone SP) has exceeded a threshold value.

Figure 6:
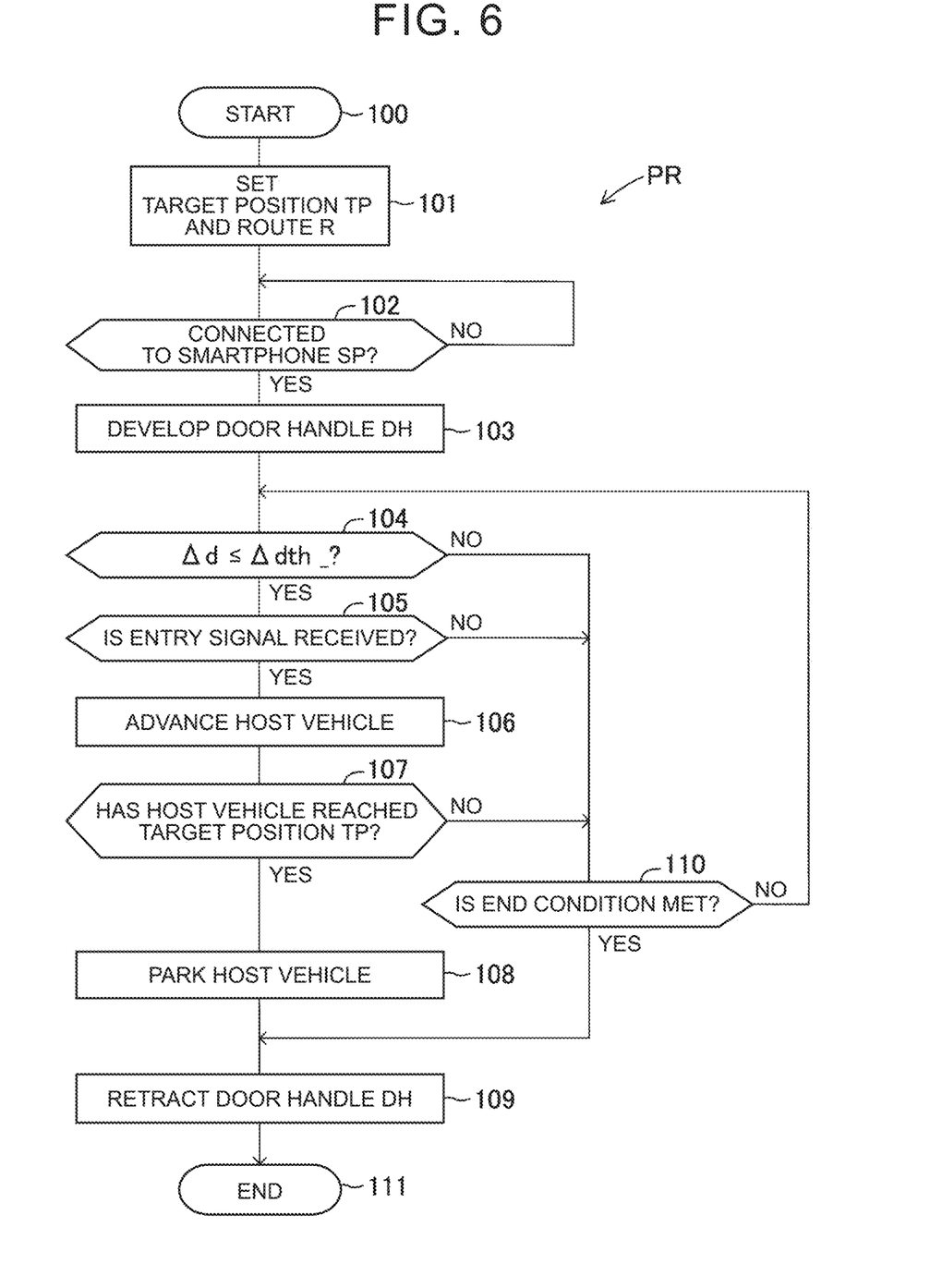
FIG. 6 is a flowchart of a parking assist program executed by a parking assist ECU.

Next, the program PR executed by the CPU of the parking assist ECU 10c (hereinafter simply referred to as a "CPU") for implementing the automatic entry function described above will be specifically described with reference to FIG. 6.

When it is detected that the switch 23 has been pushed, the CPU starts execution of the program PR in step 100, and proceeds to step 101.

When the CPU proceeds to step 101, the CPU sets a target position TP and a route R based on information acquired from the in-vehicle sensor 20. Then, the CPU proceeds to step 102.

When the CPU proceeds to step 102, the CPU determines whether the communication device 30 is connected to (paired with) the smartphone SP via a wireless communication line. When the communication device 30 is connected to the smartphone SP (102: Yes), the CPU proceeds to step 103. When the communication device 30 is not connected to the smartphone SP yet (102: No), on the other hand, the CPU returns to step 102.

When the CPU proceeds to step 103, the CPU develops the door handle DH by controlling the actuator AC via the door ECU 10b. Then, the CPU proceeds to step 104.

When the CPU proceeds to step 104, the CPU acquires a distance Δd from the collation ECU 10a, and determines whether the distance Δd is equal to or less than a threshold value Δdth. When the distance Δd is equal to or less than the threshold value Δdth (104: Yes), the CPU proceeds to step 105. When the distance Δd is not equal to or less than the threshold value Δdth (104: No), on the other hand, the CPU causes the smartphone SP to issue a predetermined warning (display an image or produce a sound to indicate that the user is out of the operable range OA), and proceeds to step 110 to be discussed later.

When the CPU proceeds to step 105, the CPU determines whether an entry signal (advancement permission signal) has been received from the smartphone SP. When the CPU has received an entry signal (105: Yes), the CPU proceeds to step 106. When the CPU has not received an entry signal (105: No), on the other hand, the CPU proceeds to step 110.

When the CPU proceeds to step 106, the CPU advances the host vehicle along the route R by controlling the drive device etc. in accordance with the control signal patterns. Then, the CPU proceeds to step 107.

When the CPU proceeds to step 107, the CPU determines whether the host vehicle has reached the target position TP. When the host vehicle has reached the target position TP (107: Yes), the CPU proceeds to step 108. When the host vehicle has not reached the target position TP yet (107: No), on the other hand, the CPU proceeds to step 110.

When the CPU proceeds to step 108, the CPU parks the host vehicle. That is, the CPU stops the host vehicle, switches the shift position to the parking position, and actuates the parking brake. Then, the CPU turns off the ignition switch, and proceeds to step 109.

When the CPU proceeds to step 109, the CPU retracts the door handle DH by controlling the actuator AC via the door ECU 10b. Then, the CPU proceeds to step 111, and ends execution of the program PR.

When the CPU proceeds to step 110, the CPU determines whether the end condition is met. When the end condition is met (110: Yes), the CPU proceeds to step 109, and ends execution of the program PR. When the end condition is not met (110: No), the CPU returns to step 104.

Automatic Exit Function

As described above, the parking assist device 1 can execute control (automatic entry control) for allowing the host vehicle to enter the parking spot PS by remotely operating the host vehicle. Additionally, the parking assist device 1 can execute control (automatic exit control) for allowing the host vehicle to exit from the parking spot PS by remotely operating the host vehicle. Specifically, the parking assist device 1 is configured to switch the ignition switch of the host vehicle from the off state to the on state by the user operating the smartphone SP (or the smart key SK). When it is detected that the ignition switch has been turned on through a remote operation, the parking assist ECU 10c sets a position in a region in the vicinity of the parking spot PS at which the host vehicle can be temporarily stopped as the target position TP, and sets a route R to the target position TP, based on information acquired from the in-vehicle sensor 20. Then, the parking assist ECU 10c develops the door handle DH by controlling the actuator AC via the door ECU 10b. Subsequently, as in the entry control, the parking assist ECU 10c detects the position (distance Δd) of the user, and executes control (exit control) for advancing the host vehicle along the route R in accordance with the mode (advancement permission signal) of a remote operation of the smartphone SP by the user when the distance Δd is equal to or less than the threshold value Δdth. When the host vehicle reaches the target position TP, the parking assist ECU 10c temporarily stops the host vehicle. In this case, it is highly likely that the user opens the door DR to get in the host vehicle. Therefore, the parking assist ECU 10c maintains the door handle DH in the developed state.

Effects

As described above, when executing the entry control and the exit control, the parking assist ECU 10c acquires the distance Δd between the user and the host vehicle by communicating with the smart key SK carried by the user positioned outside the vehicle via the transmission antenna TA built in the door handle DH. In that event, the parking assist device 1 develops the door handle DH. This allows the transmission antenna TA to be disposed on the outer side with respect to the outside surface of the outer panel DPb. Hence, a signal (a radio wave in the LF band) emitted from the transmission antenna TA is radiated outward of the host vehicle without being interrupted by the door panel DP. Thus, with the present embodiment, it is possible to set the communicable distance between the parking assist ECU 10c (communication device 30) and the smart key SK (reachable distance of the first signal S1) to a necessary and sufficient length.

The present disclosure is not limited to the above embodiment, and various modifications can be adopted within the scope of the present disclosure.

First Modification

While the reception antenna RA is disposed in the vehicle cabin in the above embodiment, the reception antenna RA may be disposed in the door handle DH.

Second Modification

In the above embodiment, the smart key SK as a device for detecting the distance Δd and the smartphone SP as a device for emitting an advancement permission signal are separate from each other. Instead, a terminal that includes a function to detect the distance Δd and a function to remotely operate the host vehicle may be adopted, for example.

What is claimed is:

1. A parking assist device to be mounted on a host vehicle including a retractable door handle device that includes:
    a door handle with a built-in antenna used for a communication with a terminal carried by a user positioned outside the host vehicle; and
    an actuator that causes the door handle to transition from a first state in which the door handle is retracted in a door panel to a second state in which a portion of the door handle where the antenna is provided projects outside the door panel,
    the parking assist device comprising a processor that is configured to communicate with the terminal using the antenna, and that is configured to execute entry control for allowing the host vehicle to enter a parking spot or exit control for allowing the host vehicle to exit from the parking spot when a predetermined condition related to a communication result is met,
    wherein the processor causes the door handle to transition to the second state when executing the entry control or the exit control.

2. The parking assist device according to claim 1, wherein after a first signal is emitted from the antenna to the terminal, the processor acquires a second signal that indicates an intensity of the first signal received by the terminal from the terminal, and determines that the predetermined condition related to the communication result is met when the intensity of the first signal indicated by the second signal is equal to or more than a threshold value.

3. The parking assist device according to claim 1, wherein the processor causes the door handle to transition to the first state when the entry control is finished.

4. The parking assist device according to claim 3, wherein the processor is configured to maintain the door handle in the second state when the exit control is finished.

5. A parking assist method to be applied to a host vehicle including a retractable door handle device including:
- a door handle with a built-in antenna configured to communicate with a terminal carried by a user positioned outside the host vehicle; and
- an actuator that causes the door handle to transition from a first state in which the door handle is retracted in a door panel to a second state in which a portion being part of the door handle and providing the antenna projects outside the door panel,
- the parking assist method comprising a first process that executes entry control for allowing the host vehicle to enter a parking spot or exit control for allowing the host vehicle to exit from the parking spot communicating with the terminal using the antenna, when a predetermined condition related to a result that the processor communicates with the terminal is met,
- wherein the first process includes the second state that causes the door handle to transition to the second state.

6. A vehicle comprising:
- a retractable door handle device including a door handle with a built-in antenna used for a communication with a terminal that carried by a user positioned outside a host vehicle, and an actuator that causes the door handle to transition from a first state in which the door handle is retracted in a door panel to a second state in which a portion being part of the door handle and providing the antenna projects outside the door panel; and
- a parking assist device including a processor configured to communicate with the terminal using the antenna and execute entry control for allowing the host vehicle to enter a parking spot or exit control for allowing the host vehicle to exit from the parking spot when a predetermined condition related to a result of the processor is met,
- wherein the processor causes the door handle to transition to the second state when executing the entry control or the exit control.

* * * * *